United States Patent Office 3,528,146
Patented Sept. 15, 1970

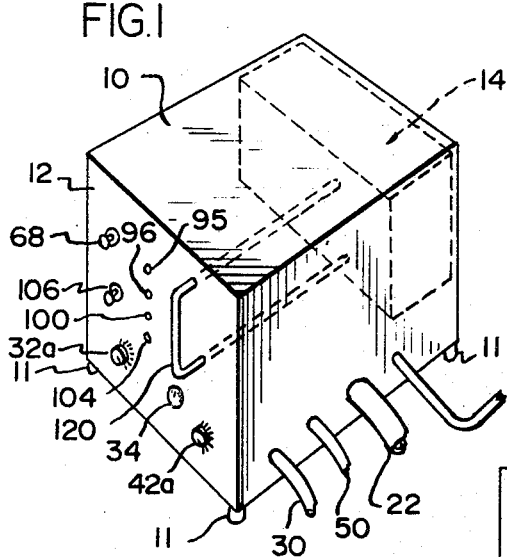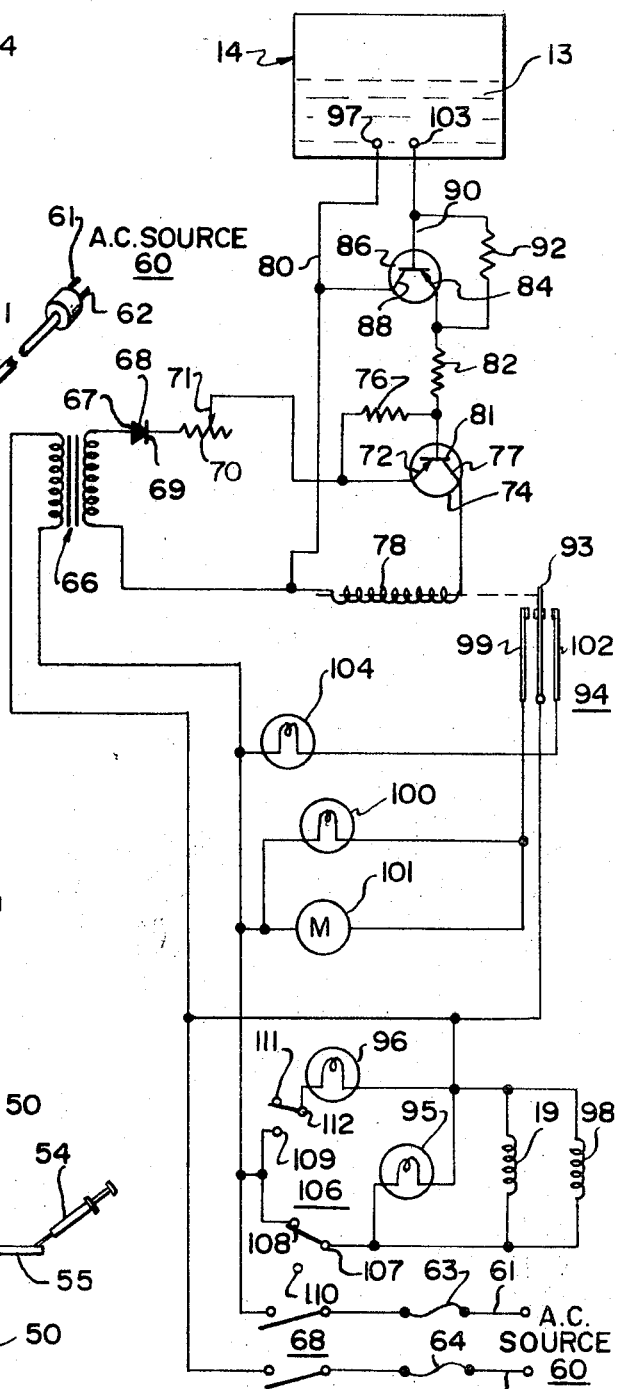

3,528,146
EMBALMING MACHINE
Armen Markarian, Chicago, and Thadeus Skuba, Hoffman Estates, Ill., assignors to Armen Markarian, Chicago, Ill.
Filed June 27, 1968, Ser. No. 740,603
Int. Cl. A01n 1/00
U.S. Cl. 27—24     9 Claims

ABSTRACT OF THE DISCLOSURE

A compact portable electrically controlled machine combining the aspirating and embalming functions including a motor driven pump, easily operated controls and system interlocks to change the flow of embalming fluid through the system.

BACKGROUND OF THE INVENTION

In order to prepare a cadaver (a dead human body) for burial, blood and body fluids must be removed and replaced with an embalming fluid. Today, there are approximately 25,000 funeral establishments in the United States, and 26,000 licensed embalmers who prepare bodies for burial. One licensed embalmer may be employed at several funeral parlors which necessitates that he transport his equipment from one location to another. This invention allows these embalmers to aspirate and embalm a body utilizing one portable machine.

In present day commercial practice, two devices are required, one to aspirate the cadaver and another to provide a pressure source for injecting the embalming fluid into the cadaver. These devices are relatively expensive, hard to transport from one location to another and have few, if any, automatic controls and features.

Although there are certain aspirating and embalming equipment available today, there has not been a single compact machine having convenient controls. This invention provides a portable machine having one motor and one pump with appropriate simple controls located on an instrument panel with indicators to signal correct automatic functioning of the machine intervals.

SUMMARY OF THE INVENTION

This invention provides a compact, portable, embalming device with a tank for containing the embalming fluid, a motor driven pump, and easily operated controls, allowing both aspirating and embalming functions to be performed utilizing this single device. This machine is electrically and electronically controlled in order to change the flow of fluid through the system with interlocks insuring proper performance of the selected function. Cleaning of the machine, including the pump and connecting tubing, is facilitated by a convenient, easy connection to a source of water, as is usually available.

DESCRIPTION OF THE DRAWINGS

FIG. 1 is a perspective view of a device embodying the invention;

FIG. 2 is a diagram of the hydraulic system depicting the fluid paths for both aspirating and embalming functions of the device; and FIG. 3 is a diagram of the electric system.

DESCRIPTION OF THE PREFERRED EMBODIMENT

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

The device, as shown in FIG. 1, is a portable unit enclosed by container 10 which houses the unit. The unit, having rubber feet 11, can be placed on a bench or counter, the feet at the underside corners of the container serving to cut down the vibration between the unit and the bench, thereby eliminating movement of the unit on the bench and also reducing any noise emanating from the moving parts of the unit. An instrument panel on the face 12 of the container provides a convenient and accessible means for mounting indicators and controls. A tank 14 having dimensions of about 11½" x 10½" x 11" is fastened to one wall within the container. Measured amounts of embalming fluid for preserving a body are placed in the tank as needed. The tank has a removable cover which provides a means for filling the tank. A formaldehyde base liquid is the most common liquid used as the embalming fluid. The controls include a pump on-off switch 68 for energizing the AC system, an embalm-aspirate switch 106 for choosing one or the other of the functions to be performed by the device, a manually regulatable control 32a for a valve 32 which controls the volume of fluid flowing to the cadaver and a manually regulatable control 42a for a valve 42 for regulating the fluid flow back to the tank. External connections to the container include a pair of wires terminated in a plug for receiving AC energization from a standard wall outlet, a water supply line 22 for connecting with a standard water source, a water discharge line 50 leading to a drain 56 and a line 30 terminated in a needle through which embalming fluid flows to the cadaver. Indicators located on the face of the instrument include a manometer 120, indicating the fluid level contained in the tank, a pressure gauge 34, indicating the pressure in the pump discharge line, an indicator light 95 energized during the embalming process, an indicator light 100 energized when the pump motor is on and an indicator light 104 energized when the fluid contained in the tank falls below a predetermined level.

Preparation of a cadaver requires generally two operations by an embalmer, embalming and aspirating. When the device is used for aspirating, the embalmer sets the controls for aspirating at opposed to embalming. The device, having been connected to electrical power and a water source, such as a wash basin water faucet, and the outflow set to a drain or waste container, is conditioned to perform the aspirating function upon closing a switch on the face of the device marked "aspirate." The machine functions for aspirating automatically upon the closing of this single switch.

FIG. 2 diagrammatically shows the hydraulic system for the aspirating-embalming machine. A tank 14 with embalming fluid 13 therein is connected through line 15 to a three-way valve 16 at inlet port 17. Another inlet port 18 of valve 16 is connected to the water source line 22, there being a check valve 24 in the line 22 to prevent flow from the valve 16 toward the water source. The water source for line 22 may be an ordinary faucet supplied from a private or public reservoir. Valve 16 is electrically controlled by solenoid 19 in such a manner that either one or the other of port 17 or port 18 is open, but not both at the same time. Outlet port 25 of the valve 16 is connected to a pump 26 through line 27, such port 25 remaining open at all times. The lines are made from commercially available material and may be of copper or plastic composition as required or desired.

During the aspiration of a body, port 38 of valve 36 and port 18 of valve 16 are open, ports 37 and 17 of the respective valves being closed, valve 32 is manually closed and the water from source 20 passing through pump 26 is forced through line 50 to create a vacuum in ejector pump 52 which is a jet type water powered pump. The vacuum created by pump 52 creates a suction in trocar 54 which is inserted into the body cavity. Trocar 54 provides the input for eliminating the waste and gases that have accumulated in the thoracic and abdominal cavities of the dead body. The waste materials are drawn into the trocar by the vaccum and flow through the outlet line 55 to a drain 56 located at a remote point where the waste and the water used in powering pump 52 are ejected.

During the embalming of the cadaver, which occurs prior to the aspiration of the body fluids, an injection needle is inserted into the carotid artery in the neck of the cadaver through which embalming fluid is injected. The push button switch on the face of the machine is moved to "embalm" and machine functions for embalming occur automatically. Pump 26 provides sufficient pressure to force the embalming fluid received through line 27 into the cadaver through line 30 having a manually operated regulating type needle valve 32 positioned for convenient control by an embalmer. Valve 32 controls the volume of embalming fluid that is allowed to enter the body. The fluid from pump 26 is also forced into inlet port 35 of three-way valve 36 during the embalming operation and is directed through outlet port 37 to the tank 14, outlet port 38 remaining closed. Solenoid 98 electrically controls valve 36 such that either one or the other of port 37 or port 38 is open, but not both at the same time. Pressure gauge 34, registering from 0 to 60 lbs. of pressure, indicates the pressure on the discharge side of the pump and ahead of the inlet to three-way valve 36. Outlet port 37 of valve 36 is connected to tank 14 by line 40 having a manually operated regulating needle type valve 42 therein. Valve 42 provides a means of controlling the pressure and volume of fluid in line 40. A pressure relief bypass valve 44 is included in the embalming hydraulic circuit around regulating valve 42 and if a predetermined pressure is exceeded, bypass valve 44 automatically operates providing an additional path for fluid flow to tank 14.

The electrical circuitry, as diagrammatically represented in FIG. 3, is energized by closing double-pole, double-throw switch 68 which connects an AC source 60 to lines 61 and 62, fuses 63 and 64, respectively, located in each line. Thus, motor 101 which drives pump 26 is energized on condition that interlock switch 94 is energized by relay coil 78. Indicator light 100 is energized when the motor is turned on.

The interlock feature requires that there be fluid immersing electrodes 97 and 102 in tank 14. If this condition is met, current will flow through the interlock control circuit, energizing relay coil 78 and closing contacts 99 and 93. The AC source supplies the power required to energize the interlock control circuit and its included electronic components. Conductors 61 and 62 are connected to the primary of transformer 66. Secondary of transformer 66 has one side connected to anode 67 of rectifier 68, while cathode 69 is connected to current-limiting potentiometer 70 which has its wiper 71 connected to emitter 72 of transistor 74, a 2N255 transistor, and 100 ohm ½ watt resistor 76. The other end of the transformer secondary is connected to collector 77 of transistor 74 through a 4.3 ohm relay coil 78 and to electrode 97 through line 80. The base of transistor 74 is connected to resistor 76 and through 82 ohm, ½ watt resistor 82 to emitter 84 of transistor 86 and 2.2K ohm resistor 92. Collector 88 of transistor 86 is connected to line 80 and base 90 is connected to resistor 92 and to electrode 103. Electrodes 97 and 103 are located within tank 14 at a predetermined height above the bottom. When the embalming fluid immerses the electrodes, a low electrical resistance path is available through the fluid for current flow between the electrodes.

The interlock control circuit built into the device operates automatically. Specifically, this circuit operates as follows. Normally open switch 68 is closed thereby energizing the circuit. As the AC circuit is energized, diode 68 rectifies the AC signal converting it to two positive going half cycles, which signal is applied to emitter 72 and base 81 of transistor 74. Current through the forward biased emitter-base junction turns on transistor 86 by forward biasing the emitter 84-base 90 junction of said transistor, resistor 92 providing the required voltage drop from emitter to base. This transistor remains turned on as long as the embalming fluid 13 in tank 14 provides a conducting path between electrodes 97 and 103. The completed circuit provides a current flow through line 80 to relay coil 78 which is terminated at collector 77 of transistor 74. Current through coil 78 causes contacts 93 and 99 of switch 94 to close.

If the level of fluid 13 falls below a predetermined amount, an interlock provision causes relay coil 78 to become deenergized and a corresponding switching of interlock switch 94 turns pump motor 101 off and correspondingly lights up indicator light 104, indicating a low fluid level. When the fluid level falls below that required to immerse electrodes 97 and 103, a high impedance results between collector 88 and base 90 of transistor 86. No current path is provided for current at base 81 of transistor 74 and transistor 86 turns off. Therefore, no current flows through line 80 to collector 77, transistor 74 becomes non-conducting and relay coil 78 is deenergized, causing contacts 93 and 102 of switch 94 to close. This transistorized control circuit indicating a low liquid level condition prevents the pump motor from burning up when there is no fluid in the tank.

The aspirate-embalm switch 106 on the instrument face electrically controls the three-way valves by an automatic circuit provided within the device. Parallel solenoids 19 and 98 are connected to terminal 107 of double-pole, double-throw switch 106 and to indicator light 95. These solenoids respectively control three-way valves 16 and 36. When switch 106 is in the aspirate position, terminal 112 is connected to terminal 111 and terminal 107 connected to 108. Indicator light 95 is turned on and solenoids 19 and 98 are energized. When switch 106 is turned to the embalm position, terminal 112 is connected to terminal 109 and terminal 107 is connected to terminal 110 opening the circuit to the solenoids which are then deenergized, also energizing embalming-process light 96.

The body to be prepared for burial is laid on a porcelain table in a supine position, the feet lower than the head. A cut is made across the carotid artery in the neck of the body. The blood of the body drains through this jugular vein incision.

The average adult human body is found by experience to take about 2½ gallons of the embalming fluid although the exact amount used in each case is determined by the operator of the machine based upon the condition, size, and weight of the body. The embalmer, from his experience, is able to determine when the body has been injected with the necessary fluid. At that time, he can open switch 68, stopping the embalming process.

The entire aspirating and embalming processes utilizing this invention usually take only 45 minutes. Upon completion of the process, water is poured into the tank, switch 106 is set to "aspirate" and the switch 68 energized. The machine is cleaned by water which is circulated through the valves, pump, tubing, tank and accessories and eliminated through embalming fluid conducting line 30. The tank is sponged dry to remove excess water, usually less than one-quarter inch, after the completion of the cleaning operation. The simplicity of this cleaning operation provides a substantial improvement over previous systems which required a dismantling of the apparatus by a trained mechanic. Embalming apparatus that is cleaned after use has a longer useful life as embalming fluid chemically causes harmful effects to pump motors, valve and tubing that come in contact with the fluid.

We claim:

1. A unit for selectively performing embalming and aspirating functions upon a cadaver, comprising:
   a housing;
   a motor driven pump in the housing having a fluid inlet and a fluid outlet;
   a tank within the housing adapted to contain embalming fluid;
   a supply fluid line from the tank to the pump inlet;
   a discharge fluid line from the pump outlet to the tank, said lines providing for circulation of embalming fluid from the tank through the pump and back to the tank;
   an embalming fluid conducting line connected to the discharge line for conducting such fluid to a cadaver;
   a water supply line connected to said supply fluid line ahead of the pump;
   a water discharge line connected to the discharge fluid line from the pump and directed to drain;
   an ejector in the water discharge line and an aspirating line connected to the ejector;
   valving at the connections of said embalming fluid and water lines;
   and interlocked controls automatically positioning said valves to permit flow of only one of said embalming and water fluids at a time through the pump.

2. The embalming and aspirating unit of claim 1 wherein the valving includes two solenoid operated three-way valves, one at the junction of the supply lines and the other at the junction of the discharge lines and means electrically coupling said solenoid operated valves to permit only one fluid to pass through the pump at a time.

3. The embalming and aspirating unit of claim 1 in which a manually controllable valve is located in said embalming fluid conducting line for regulating the volume and pressure of fluid flow to the cadaver, said valve being manually closable during the aspirating function of said unit.

4. The embalming and aspirating unit of claim 1 in which a manually controllable valve is located in said discharge fluid line from the pump to the tank for regulating the volume and pressure of fluid flow through said line.

5. The embalming and aspirating unit of claim 4 including a bypass relief valve in a parallel connection with the manually controllable valve in the discharge fluid line which automatically operates when a predetermined pressure is exceeded providing an additional path for fluid flow to the tank.

6. The embalming and aspirating unit of claim 1 including a first switch means for energizing the electric system and a manually controllable switch means for setting said valving selectively for either the embalming or aspirating function of said unit.

7. The embalming and aspirating unit of claim 1 including indicating means comprising:
   a manometer for indicating the fluid level contained in the tank;
   a pressure gauge for indicating the pressure in the pump discharge line;
   a first visual light indicator indicating the energization of the pump motor;
   a second visual light indicator energized during the embalming process;
   a third visual light indicator for indicating low liquid level in the tank, and means for energizing each of said light indicators simultaneously with operation of the condition to be indicated.

8. The embalming and aspirating unit of claim 1 wherein the housing is a box-like container generally of a size which can be placed on a counter, said housing enclosing the motor driven pump, the tank, the supply fluid line, the discharge fluid line, the valving and the automatically interlocking controls and having external lines respectively for connection to a water source, an electric power source, and said lines for connection with the cadaver and to drain.

9. The embalming and aspirating unit of claim 1 including means in the tank for sensing low liquid level, an interlocking control circuit activated by said sensing means for electrically turning off the pump motor and a visual indicator whereby the pump motor is turned off and the indicator energized when the low liquid level is sensed.

References Cited

UNITED STATES PATENTS

| | | | |
|---|---|---|---|
| 2,118,704 | 5/1938 | Grontkowski | 27—24 |
| 2,313,805 | 3/1943 | Crawford et al. | 128—227 |
| 2,569,016 | 9/1951 | Mitchell | 27—24 |
| 2,626,446 | 1/1953 | Moore | 27—24 |
| 3,420,181 | 1/1969 | Berry | 103—5 |
| 3,419,945 | 1/1969 | Sawyer | 27—24 |

RICHARD A. GAUDET, Primary Examiner

J. B. MITCHELL, Assistant Examiner